US010101552B2

(12) United States Patent
Alford et al.

(10) Patent No.: US 10,101,552 B2
(45) Date of Patent: Oct. 16, 2018

(54) RETRACTABLE FIBER OPTIC REEL ASSEMBLY

(71) Applicants: John Alford, Kenosha, WI (US); Christopher Gazdic, Arlington Heights, IL (US)

(72) Inventors: John Alford, Kenosha, WI (US); Christopher Gazdic, Arlington Heights, IL (US)

(73) Assignee: Konnectronix, Inc., Gurnee, IL (US)

( * ) Notice: Subject to any disclaimer, the term of this patent is extended or adjusted under 35 U.S.C. 154(b) by 221 days.

(21) Appl. No.: 15/131,818

(22) Filed: Apr. 18, 2016

(65) Prior Publication Data

US 2017/0299835 A1    Oct. 19, 2017

(51) Int. Cl.
*H02G 11/00* (2006.01)
*G02B 6/44* (2006.01)
*B65H 75/44* (2006.01)

(52) U.S. Cl.
CPC ....... *G02B 6/4459* (2013.01); *B65H 75/4449* (2013.01)

(58) Field of Classification Search
CPC ....... H02G 11/00; H02G 11/006; H02G 11/02
See application file for complete search history.

(56) References Cited

U.S. PATENT DOCUMENTS

| | | | |
|---|---|---|---|
| 6,220,413 B1* | 4/2001 | Walters | G02B 6/4457 191/12.4 |
| 2012/0126047 A1* | 5/2012 | Skowronski | B65H 75/4449 242/388.6 |
| 2013/0076217 A1* | 3/2013 | Thompson | B65H 75/14 312/309 |
| 2013/0171865 A1* | 7/2013 | Ceraldi | H01R 13/72 439/501 |
| 2013/0284843 A1* | 10/2013 | Mertesdorf | B65H 75/4402 242/397 |

* cited by examiner

*Primary Examiner* — Robert J McCarry, Jr.
(74) *Attorney, Agent, or Firm* — Vitale, Vickrey, Niro & Gasey

(57) ABSTRACT

A fiber optic retractable cord reel assembly is disclosed. The fiber optic cord reel assembly includes a continuous fiber optic cord with a retractable end enclosed in a shroud and a stationary end exposed from the shroud. The retractable cord reel may have a rotatable ferrule configured to adapt to an expandable coil having various trajectories within the cord reel.

6 Claims, 10 Drawing Sheets

RETRACTABLE FIBER OPTIC REEL ASSEMBLY

FIELD OF THE INVENTION

The present invention relates generally to a retractable cable reel assembly, and more specifically relates to a retractable reel including a continuous fiber optic cable, a potential power cable, and a flexible conduit or sheath for covering such one or more cables. More specifically, the invention deals with a fiber optic reel assembly that may include, but is not limited to a continuous, piece of fiber (e.g., a fiber optic cord or cable) with a stationary end and a retractable end, the retractable end being covered with a flexible conduit, with the conduit having a larger interior diameter than the diameter of the cable(s) placed therein, a housing and reel for containing at least a portion of the flexible end, and a variable portion of the retractable end and related conduit, and a ferrule or similar mechanical control for cable management.

BACKGROUND OF THE INVENTION

Retractable cord reels have been used in various applications to retractably store various types of cables. Typically, a reel might have a stationary end and a retractable end, the retractable end capable of extension from and retraction back into the reel, and a stationary end that does not move during extension or retraction. Such a configuration reduces the mess typically associated with loose wires, as well as dangers related to loose cords, hazardous operating environments and the like.

The use of fiber optic cable and associated components to communicate information has increased dramatically, due in part to the increased need to transmit larger amounts of information more rapidly (e.g., real-time video). These higher data speeds can be met using an optical fiber medium. Essentially, transmission of information using fiber optics is achieved using light pulses that traverse along a glass or plastic optical wire or optical fiber. Thus, as the need for faster communication has grown, optical fiber, because of its ability to transmit more information at higher speeds, is an improvement over conventional copper wire for providing various communication links. Further, not only is more data transmitted at higher speeds, but optical fiber is less subject to interference (e.g., electromagnetic interference), thereby reducing the need to shield, retransmit or amplify signals. However, existing available structures are unsuitable for addressing the challenges posed by optical fiber.

In one prior art retractable reel, the extendable and stationary portions of a cord may be separate, but may be connected for example by brush-like contacts. The brush-like contacts slide along the inside or outside of the rotating spool, effectively maintaining a continuous contact between the moving parts. However, such arrangements would require lightpipes or similar structures which enable the communication of data between the cables and thus create undue expense and complexity. Furthermore, while high data transfer may be enabled over fiber optic cable, the typical profile of such case is flat, and is thus less tolerant to twisting in a cord reel in a retractable application, especially over repeated use.

A second type of retractable cord reel has been developed that maintains a constant connection between the retractable and stationary ends of the cord through the use of a spool divided into two chambers: one for holding a round retractable cord, and a second, expansion chamber holding a coil of flat cord that can be expanded within the reel housing. Attempts have been made to use a round cord as the stationary expanding cord, but it is inefficient and prone to jamming. Thus, the flat/round combination is preferred. The retractable cord is connected to the stationary end through an internal coil, which may expand through its chamber during rotation of the spool. An example of this type of reel is disclosed in U.S. Pat. No. 5,094,396 to Burke, the disclosure of which is hereby incorporated by reference.

The expansion cord length may be minimized by permitting expansion of the cord followed by a reverse-direction contraction of the cord. This process is illustrated in U.S. Pat. No. 6,372,988 to Burke, the disclosure of which is hereby incorporated by reference. An additional approach is shown in U.S. Pat. No 8,387,763 (the disclosure of which is also incorporated herein by reference) for reducing mechanical strain from the repeated back and forth bending of the retractable segment of the cord, e.g., though the use of a ferrule.

While these earlier approaches improved upon the prior art, such designs still limitations in the applicability to a single, continuous cord segment. For instance, the use of a single round cord as the stationary expanding cord is prone to jamming, while use of a single flat cord is prone to twisting and excessive wear. Also, fiber optic cables are prone to developing stresses within the fibers, so there is a problem with providing a cord or cable design that provides sufficient strength for repetitive winding and unwinding while sufficient give within the cord to avoid undue stresses being applied to the fibers themselves. Moreover, such existing approaches do not address the complexity and risk for entanglement and failure when the application requires running multiple cords (e.g., data and power) off of the same reel. Thus, there is need for an improved configuration and design which enables cost efficient improved durability for a fiber optic cord reel assembly including portions including a retractable round cord and a stationary, expanding flat cord in a multi-chamber cord reel assembly.

Definition of Terms

The following terms are used in the claims of the patent as filed and are intended to have their broadest plain and ordinary meaning consistent with the requirements of the law:

Ferrule: A rotatable structure at least partially disposed with the spool and used to mechanically engage the expanding cord segment so as to reduce or eliminate the creation of severe sharp bending of the expanding cord during operation.

"Conduit": A covering having a substantially round cross section and cable of housing at least a fiber optic cord and (optionally) a power cord and having an internal diameter greater than the outside diameter of the Fiber optic cord so as to provide a gap between the two, thereby allowing the fiber to move within preventing stress from be applied to the fiber.

"Flat Cord" or "Fiber Optic Cord" comprises a plurality of optical fibers that are used to carry light, at least some of which are arranged in a substantially parallel, side-by-side configuration. The flat cord or flat portion may further include (but is not limited to) cords or cables which may be round as individual cables but, when taken together, form a substantially flat or non-round cable cross-section.

Where alternative meanings are possible, the broadest meaning is intended. All words used in the claims set forth below are intended to be used in the normal, customary usage of grammar and the English language.

SUMMARY OF THE INVENTION

The present invention relates to one or more of the following features, elements or combinations thereof.

One disclosed embodiment is directed to improvements in a retractable cord reel of the type having a rotating spool and cord expansion chamber. The reel has continuous fiber optic cord comprising a retractable portion of the cord and a stationary cord end of the assembly. The retractable portion of the cord is encased within a conduit having a substantially round cross section an internal diameter greater than the outside diameter of the Fiber optic cord so as to provide a gap between the two, thereby allowing the fiber to move within preventing stress from be applied to the fiber.

The disclosed spool is capable of rotation within a stationary housing, which may be illustratively mounted on a wall or similar surface. The disclosed apparatus contains, in one embodiment, transition chamber within which the conduit is separated from the fiber optic cord so as to leave the flat fiber optic cord exposed. The expansion of the fiber optic cord within the flat cord expansion chamber may be configured to allow the fiber optic cord to wind back around the spool in a reverse direction after expansion.

As disclosed herein, a ferrule may be added to this innermost portion to prevent repetitive sharp bending of the exposed fiber optic cord segment, thereby improving the lifespan of the fiber optic cord and therefore the apparatus. In the illustrative embodiment, the flat cord entering the expansion chamber may be positioned to have two ninety-degree bends prior to entering the opening in the ferrule. The flat cord entering the expansion chamber may also comprise a helical coil to accommodate the rotation of the ferrule relative to this portion of the cord.

Thus, it can be seen that one object of the disclosed invention is to provide a mechanism for the reduction of mechanical stresses on a continuous fiber optic cord and a resulting improvement in the durability of a fiber optic cord reel assembly due to the elimination of repetitive bending at sharp angles.

A further object of the present invention is to provide a structure for a single contiguous fiber optic cord to be used in an assembly including a retractable portion having an retractable portion including an outer conduit for providing a substantially circular cross section to facilitate improved use during repeated retraction and extension, and a stationary end having a substantially flat cross section to avoid jamming of the cord reel assembly.

Still another object of the present invention is to provide a conduit for the sealed enclosure of a fiber optic cord with a gap therein to reduce undue bending stresses on the optical fibers of the cord.

Yet another object of the present invention is to provide a mechanism for the simultaneous retraction and extension of a parallel power cord and fiber optic cords in a single cord reel assembly.

It should be noted that not every embodiment of the claimed invention will accomplish each of the objects of the invention set forth above. For instance, certain claimed embodiments of the invention will not require power cord and a fiber optic cord within the conduit. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

DETAILED DESCRIPTION OF EMBODIMENTS OF THE INVENTION

Figure 1:
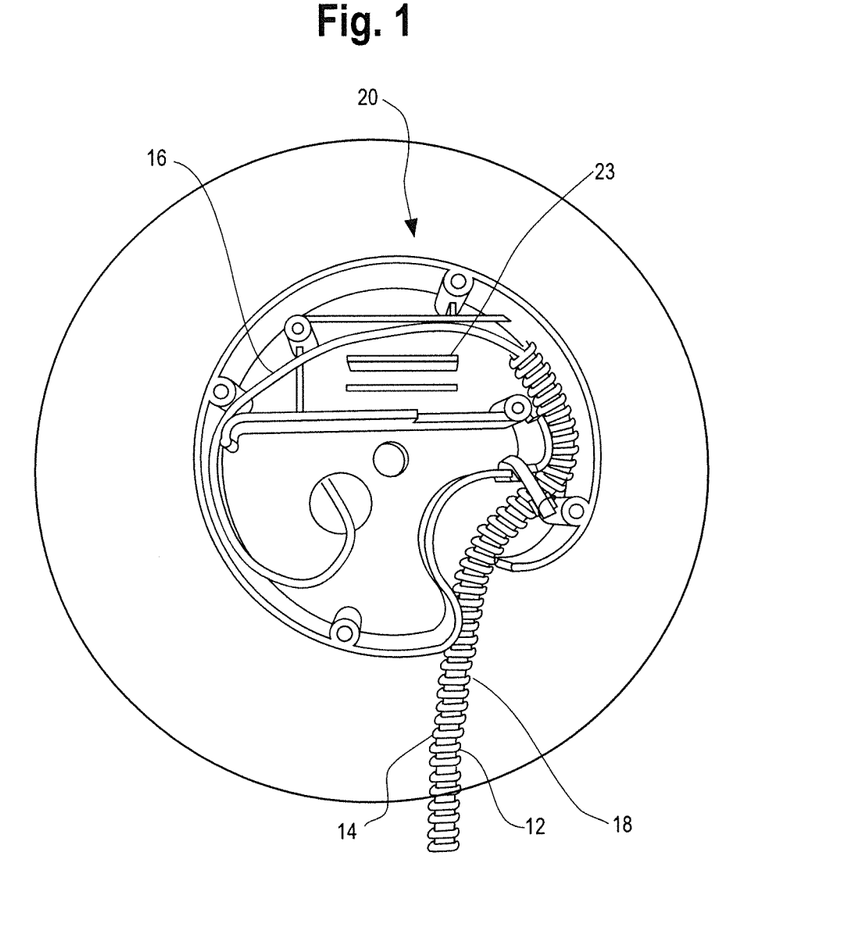
FIG. 1 depicts a first interior chamber of the retractable cord reel assembly, the interior chamber transitioning between the round (conduit enclosed) and flat portions of the fiber optic cord.
Figure 2:
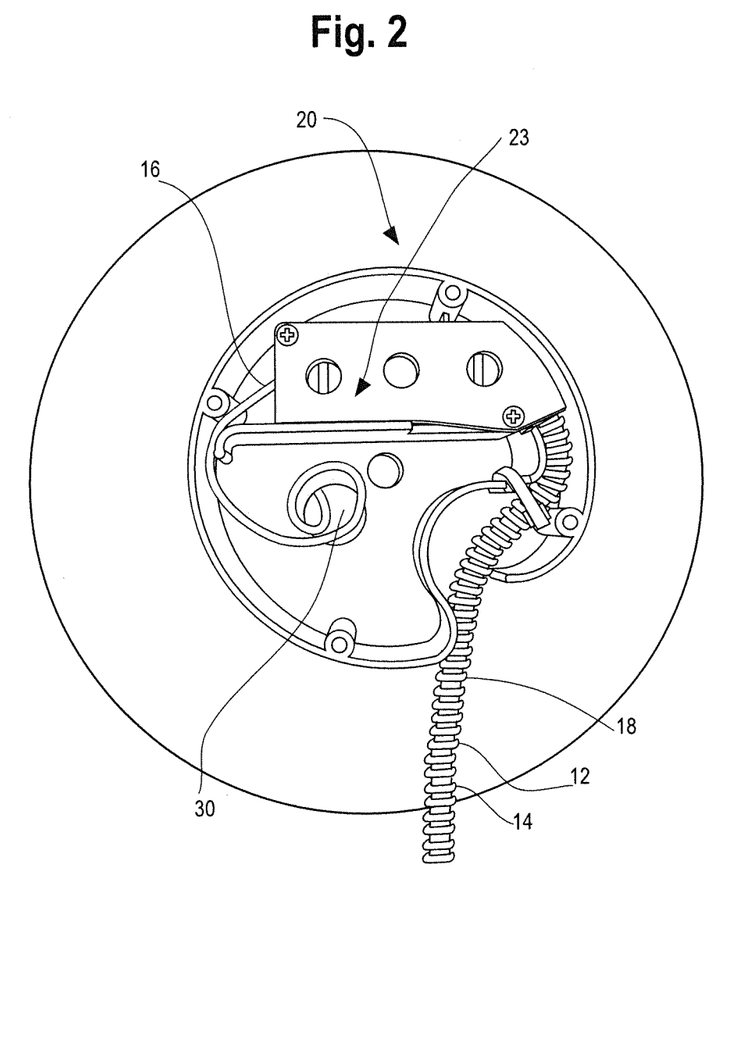
FIG. 2 depicts a first interior chamber of the retractable cord reel assembly of FIG. 1 in conjunction with the ferrule component.

As can be seen in FIGS. 1-2, the present invention comprises a retractable fiber cord reel assembly 10 for managing and organizing a cord 12. It is contemplated that cord 12 will be a continuous fiber optic cord, although it could be another contiguous high speed cable for which retraction into a housing (as shown in FIGS. 8-11) could be desirable.

Figure 6:
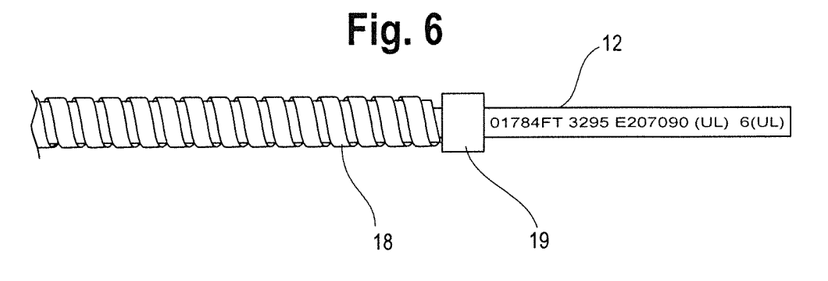
FIGS. 6 and 7 depict the transition between flat and round fiber optic segments, i.e., exposed and conduit enclosed segments, with a grommet for managing mechanical stresses for such transitions.
Figure 7:
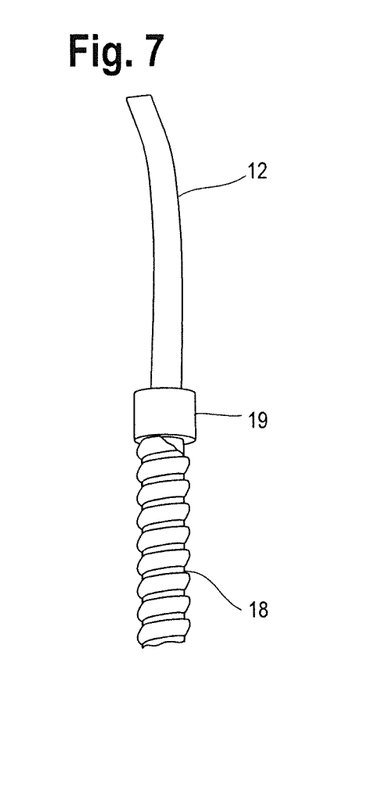
Figure 8:
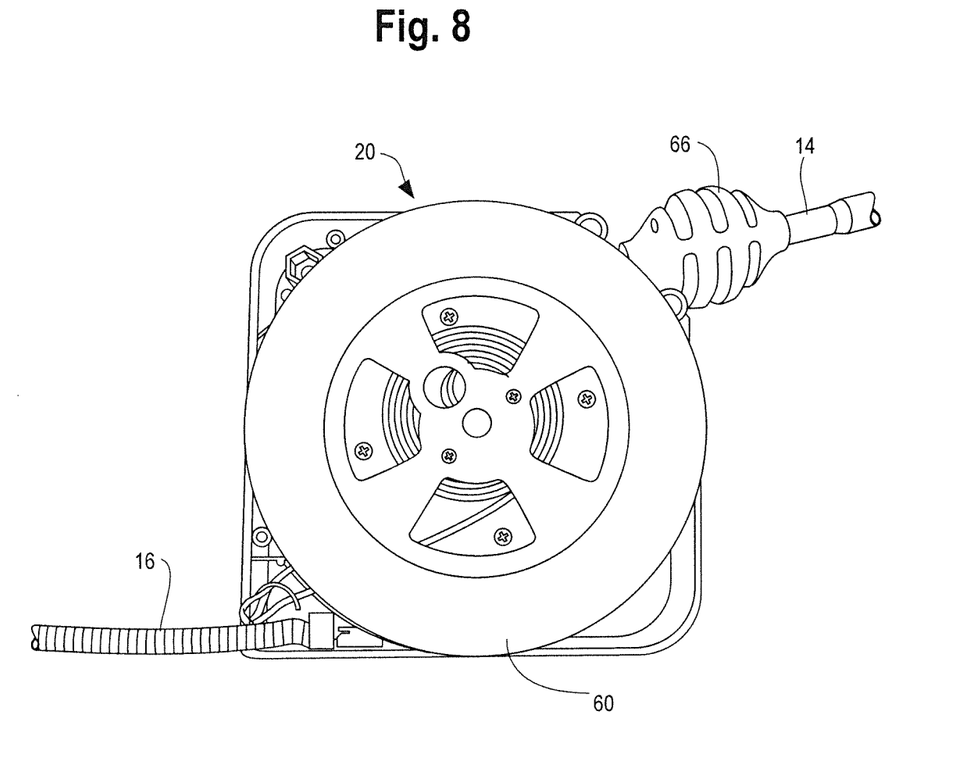
FIG. 8 is an exposed top view of the retractable cord reel assembly including the housing as shown in FIG. 5.
Figure 9:
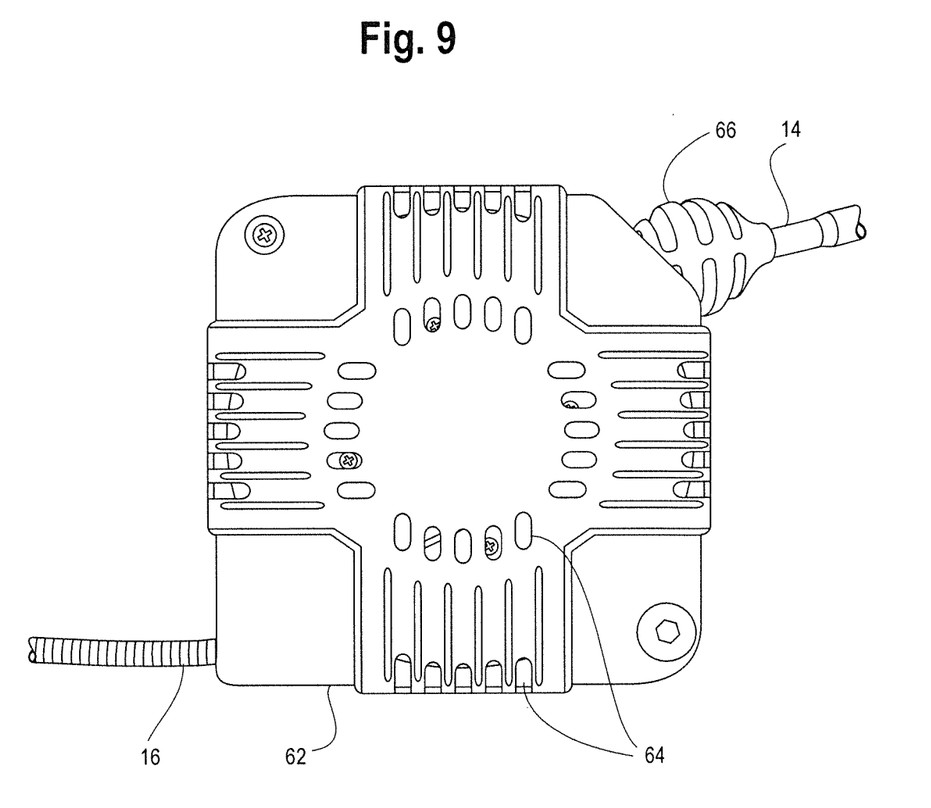
FIG. 9 is a top view of the retractable cord reel assembly including the housing and cover.
Figure 10:
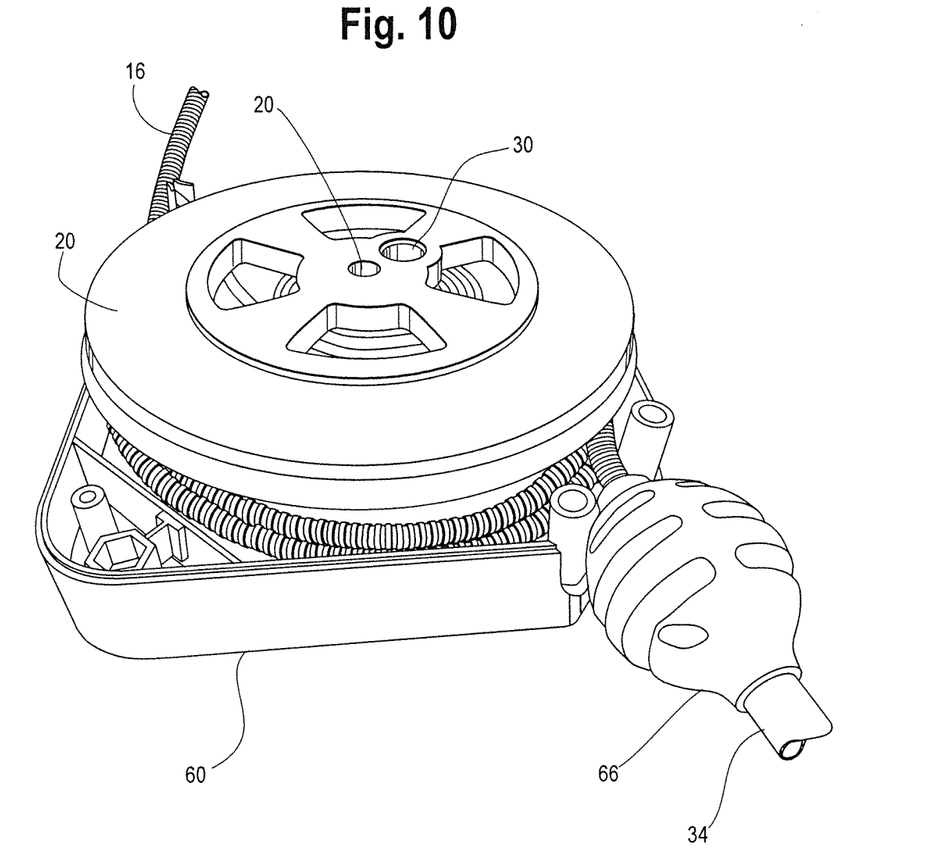
FIG. 10 is a top perspective view of the cord reel assembly including the housing as shown in FIG. 8, with the retractable portion of the fiber optic cord shown in the foreground.
Figure 11:
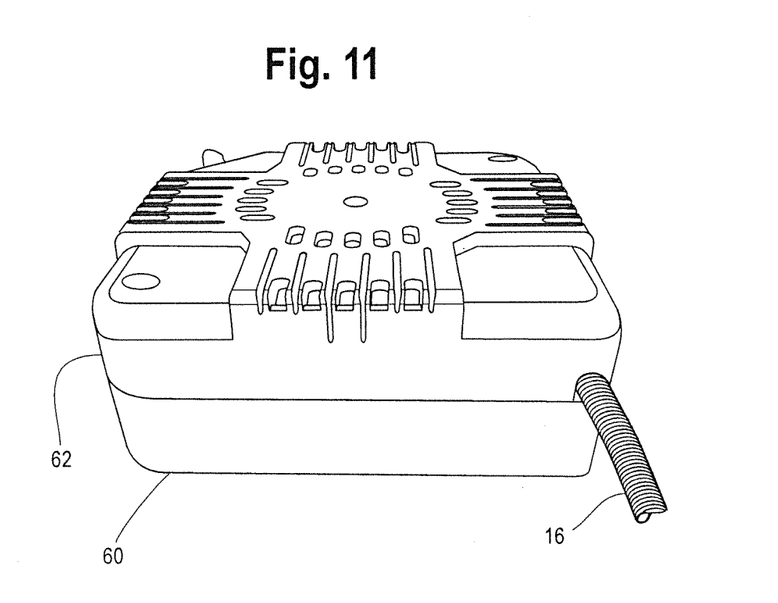
FIG. 11 is a top perspective view of the cord reel assembly including the housing and cover as shown in FIG. 9, with the stationary portion of the fiber optic cord shown in the foreground.

Assembly 10 is illustratively configured such that the cord 12 is continuous (i.e., unspliced) between a retractable portion 14 and a stationary, expandable portion 16 of cord 12. As set forth in detail below, assembly 10 is capable of many of these features due to cord 12 comprising a flat profile such that the stationary portion is capable of expansion in an enclosed expansion chamber, while the retractable portion is enclosed in a conduit 18 to enable withdrawing from and retraction into assembly 10. Cord 12 preferable comprises a plurality of glass or fiber optic threads arranged in a substantially parallel or flat profile configuration, such as is commercial available from Corning, Inc. as ClearCurve® $OM_2$ multimode fiber. The conduit 18 has a substantially circular cross-section that maintains its cross sectional shape, such as stainless steel. It may further include a jacket material (not shown) such as PVC. One important feature of the present invention is the presence of a gap between the interior diameter of the conduit 18 and the exterior diameter of the cord 12. For instance, in one preferred embodiment, the conduit has an OD of 0.345" and an ID of 0.21" which, when used with the aforementioned multimode fiber creates a gap between the two structures so as to prevent undue mechanical stresses on the conduit 18 during repeated retracting and extending. As shown in FIGS. 6-7, transitions between the portions of cord 12 that are exposed or covered by conduit 18 (such as the transition between the expandable portion 16 and the retractable portion 14) can be facilitated by grommet 19 which ensures that the cord 12 stays in place with conduit 18.

Figure 3:
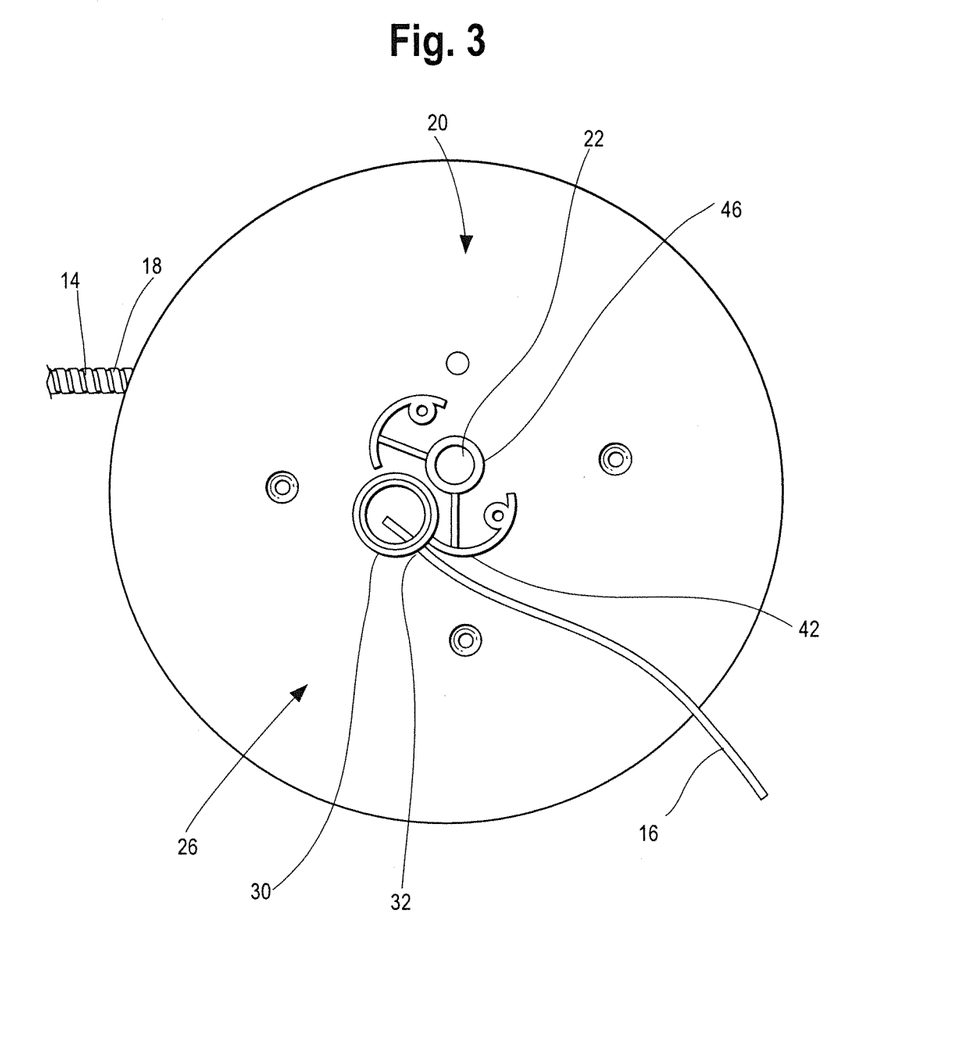
FIG. 3 depicts the movement of a ferrule during the expansion of the flat, exposed fiber optic cord within a second chamber contained within the cord reel assembly.
Figure 4:
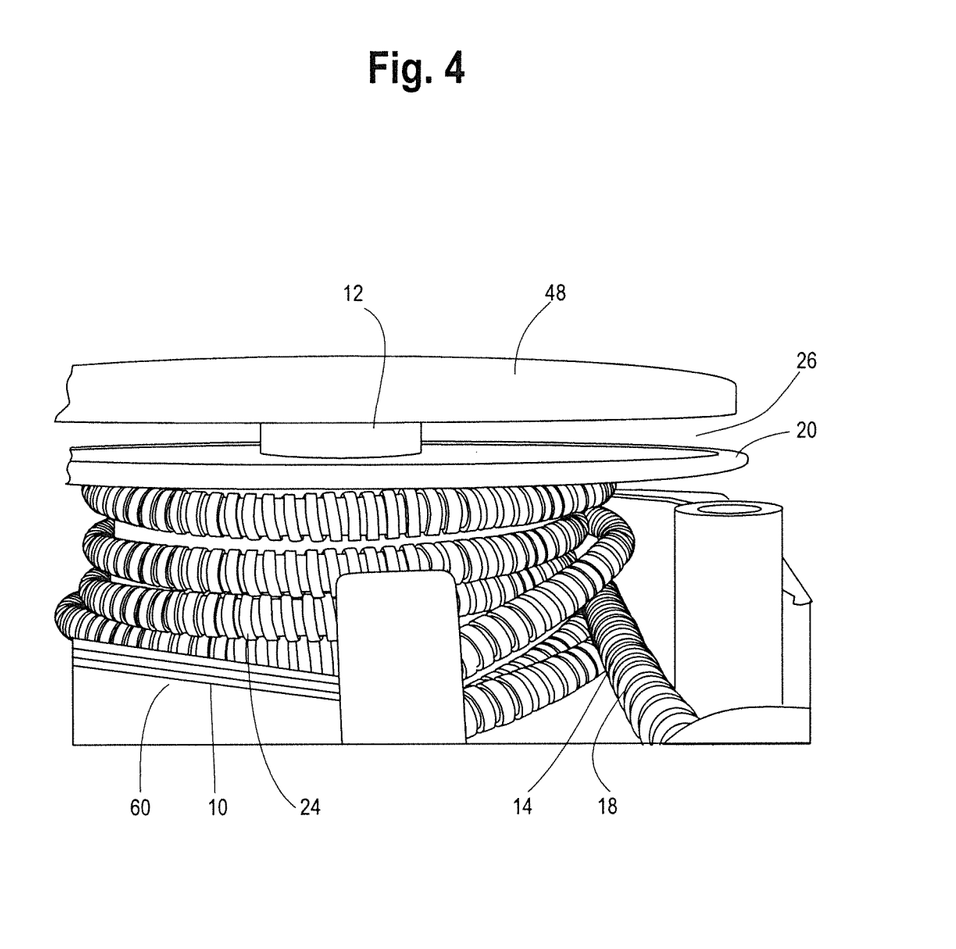
FIG. 4 is a side cross-sectional view of the retractable cord reel assembly including first and second chambers.

In the embodiment shown in FIGS. 1-4, the retractable cord reel assembly 10 comprises a spool 20 for rotation about axis 22, with a transition space 23 located therein, the transition space 23 being the location where the cord 12 separates from the conduit 18. Spool 20 is disclosed as having a first chamber 24 and a second chamber 26. Housing 60 for assembly 10 may define the outer walls, or periphery, of chamber 24 via rounded corners (not shown). Chamber 24 provides storage for cord retractable portion 14 in assembly 10, as can be seen in FIG. 4.

Attached to the spool 20 opposite the first chamber may be a second wall 46. Extending radially from second wall 46 may be fixed any number of small planar tabs 42, the radially outermost ends of which define a somewhat cylindrical inner boundary for the expandable portion 16 of cord 12. Wall 46 may also define the inner boundary of for the expandable section of cord 12. As shown in FIGS. 3 and 4, Spool 20 may also comprise a radial flange 48 mounted to abut cylindrical wall 46 and tabs 42. Flange 48 functions in part to position and maintain flat cord 18 in flat cord second chamber 26. In another preferred embodiment (not shown), the second chamber 26 may include outer walls, or periphery defined by housing 60 via rounded corners.

As shown in FIGS. 8-11, the assembly typically includes a housing 60 and a cover 62, which may optionally include vents 64 for avoiding or reducing thermal buildup during operation. In addition, the retractable portion 14 of cord 12 may include a cord stop/grip 66, which provides a preferred location for users to grab onto instead of grabbing fiber to pull out the cord 12.

Beyond aperture 28, FIGS. 2 and 3 show a cylindrical ferrule 30 through which flat expandable portion 16 passes before entering flat cord expansion chamber 26. Ferrule 30 and aperture 28 may be located along round inner boundary 44 of flat portion 18 in place of one of the tabs 42. Ferrule 30 may contain a slit 32 through its wall parallel to its axis. Flat expandable portion 16 may make a second ninety-degree rotation through slit 32 before entering flat cord expansion chamber 26.

Figure 5:
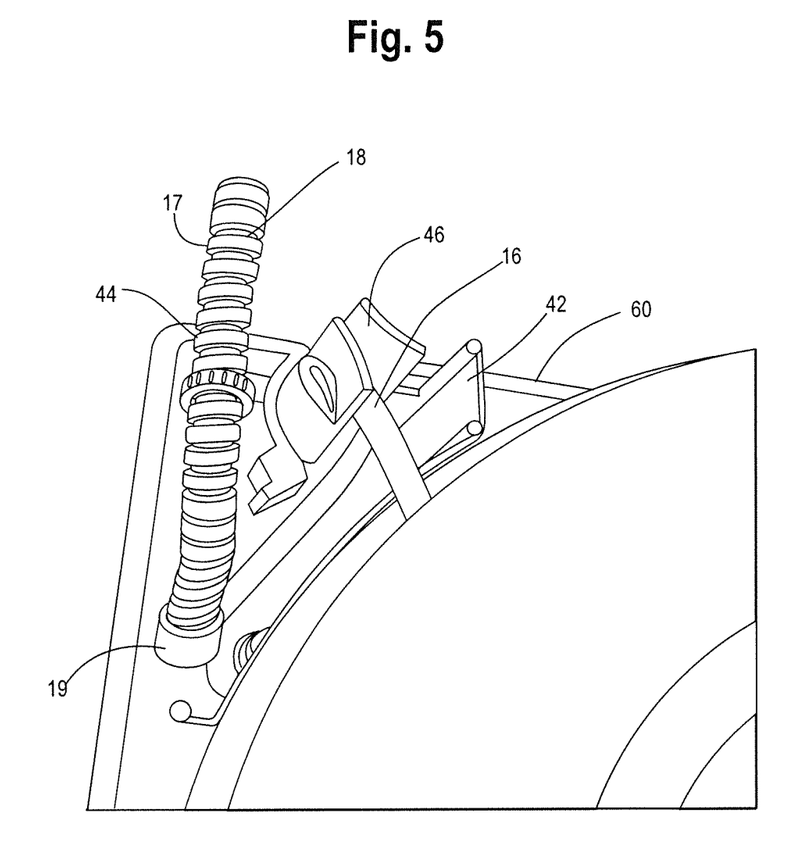
FIG. 5 is a detail view of a flat fiber optic cord segment exiting the housing through a transition block.

As illustrated in FIG. 5, through aperture 30, the flat cord may enter a transition block 42. The interior of splice block 42 may direct the flat expandable portion 16 to hole 44 where it becomes the stationary end 17. The stationary end may further optionally have conduit 18 encasing it as the stationary end 17 (i.e., the portion outside the housing) does not wind or unwind such that the exposure of the flat profile is necessary. FIG. 5 shows flat portion 18 entering a narrow pass 46, which it coils back underneath to reach hole 44. transition block 42 allows the flat fiber optic cable segment to be enclosed again with a conduit 18. Transition block 42 may be filled with a potting compound such as epoxy or silicone to protect the spliced wires against the entry of dirt, debris, or elements.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A retractable cord reel apparatus, the apparatus comprising
   a housing,
   a spool within and arranged for rotation relative to the housing,
   wherein the spool is axially divided into a plurality of chambers, said spool defining a rotating aperture mounted on the rotating spool near the axis of spool rotation,
   a single, continuous cord traversing the interior of the housing and the plurality of chambers and terminating in retractable and stationary ends external to the housing,
   wherein, within a first of the plurality of chambers, the cord comprises a retractable coil encased within a conduit having a substantially circular cross section, the conduit wound around the axis of the spool and attached at its periphery to said retractable end through an aperture in the housing,
   wherein, within a second of said chambers, the cord is separated from the conduit and comprises an expandable coil wound around the axis of the spool, said expandable coil having first and second ends, said expandable coil having its first end attached to the housing wherein, during retraction of the cord from the first chamber, the expandable coil expands towards the perimeter of the second chamber, after which, the expandable coil winds back into the core of the second chamber wound in a direction opposite that which it began,
   wherein the expandable coil enters the core of the second chamber through a rotating aperture arranged for rotation about its own axis, and
   wherein the rotating aperture rotates to accommodate the changing trajectory of the expandable coil.

2. The apparatus of claim 1, wherein the rotating aperture is a ferrule and the segment comprises an expandable coil adjacent to the ferrule and centered about the axis of the ferrule.

3. The apparatus of claim 1, wherein the expandable coil enters the aperture in the housing via a transition block in the corner of the housing.

4. A retractable cord reel apparatus, the apparatus comprising
   a housing,
   a spool within and arranged for rotation relative to the housing,
   wherein the spool is axially divided into a plurality of chambers, said housing defining a rotating aperture mounted on the housing near the axis of spool rotation,
   a continuous fiber optic cord traversing the interior of the housing and the plurality of chambers and terminating in retractable and stationary ends external to the housing,
   wherein, within a first of the plurality of chambers, the fiber cord comprises a retractable portion enclosed within a conduit, the conduit being wound around the axis of the spool and extending to a first, retractable end of the fiber optic cord through an aperture in the housing,
   wherein, within a second of said plurality of chambers, the fiber optic cord includes an expandable coil portion wound around the axis of the housing, said expandable coil portion having first and second ends, the conduit separating from the fiber optic portion at the first end, and said expandable coil portion having its first end attached to the rotating spool near the perimeter of the second chamber wherein, during retraction of the shroud and retractable cord portion from the first chamber, the expandable coil expands towards the perimeter of the second chamber, after which, the expandable coil winds back into the core of the second chamber wound in a direction opposite that which it began, wherein the expandable coil portion enters the core of the second chamber through a rotating aperture arranged for rotation about its own axis, and wherein the rotating aperture rotates to accommodate the changing trajectory of the expandable coil.

5. A retractable cord reel apparatus for a single continuous flat cord having a conduit over a portion thereof so as to create a round cross section, the apparatus comprising:

a housing, wherein the housing comprises a base mountable to a surface and a cover opposite the base, a spool within and arranged for rotation relative to the housing, wherein the spool is axially divided into a plurality of chambers, said spool defining a rotating aperture mounted on the rotating spool near the axis of spool rotation, wherein, within a first of the plurality of chambers, the portion of the cord having conduit is wound around the axis of the spool and attached at its periphery to said retractable end through an aperture in the housing, wherein the outer extremity of the retractable cord coil comprises a retractable end capable of withdrawal through a hole in the housing, wherein, within a second of said chambers, the flat cord has no conduit and is wound around the axis of the spool, said flat cord having first and second ends, said flat cord having its first end attached to the housing wherein, during retraction of the cord from the first chamber, the flat cord expands towards the perimeter of the second chamber, after which, the flat cord winds back into the core of the second chamber wound in a direction opposite that which it began, wherein the outer extremity of the flat coil forms a stationary end by exiting the apparatus via a hole in the housing.

6. A retractable cord reel apparatus, the apparatus comprising a housing including a spool rotatable relative thereto, the spool being axially divided into at a first chamber and a second chamber, the spool supporting a continuous cord attached thereto, wherein the cord comprises an expansion segment and a retractable segment, each of which segments is coiled around a rotatable spool, wherein the retractable segment is rotatable around the first chamber of the spool, the retractable segment further enclosed within a conduit having a substantially circular cross section, and the retractable segment may be withdrawn from the housing, causing rotation of the spool and simultaneous expansion of the expansion segment within second chamber, the expansion segment having a generally flat cross section that is separated from the conduit, wherein the end of the expansion segment opposite the retractable segment forms a stationary end outside of the housing.

* * * * *